United States Patent [19]

von Jordan et al.

[11] 3,914,387

[45] Oct. 21, 1975

[54] METHOD OF REMOVING SULFUR DIOXIDE FROM A DUST CONTAINING EXHAUST GAS STREAM

[75] Inventors: Wenzel von Jordan, Wixhausen; Hans-Jörg Barth, Langen; Hans Koch, Frankfurt am Main; Günter Boning, Bergen-Enkheim, all of Germany

[73] Assignee: Metallgesellschaft Aktiengesellschaft, Frankfurt am Main, Germany

[22] Filed: Jan. 14, 1974

[21] Appl. No.: 433,357

[30] Foreign Application Priority Data

Jan. 31, 1973 Germany............................ 2304496

[52] U.S. Cl................................. 423/242; 423/166
[51] Int. Cl.²........................................ C01B 17/00
[58] Field of Search.......................... 423/242–244, 423/166, 167, 551

[56] References Cited
UNITED STATES PATENTS

| | | | |
|---|---|---|---|
| 1,271,899 | 7/1918 | Howard .............................. | 423/242 |
| 3,318,662 | 5/1967 | Pauling ............................... | 423/522 |
| 3,533,748 | 10/1970 | Finfer et al. ........................ | 423/242 |
| 3,775,532 | 11/1973 | Shah .................................... | 423/242 |

Primary Examiner—Oscar R. Vertiz
Assistant Examiner—Gregory A. Heller
Attorney, Agent, or Firm—Karl F. Ross; Herbert Dubno

[57] ABSTRACT

A method of removing sulfur dioxide ($SO_2$) from a dust-containing exhaust gas, especially waste gas from a metallurgical process, wherein the exhaust gas is treated with an aqueous solution of sodium hydroxide (NaOH) and disodium sulfate ($Na_2SO_4$) so that a major part of the $SO_2$ is reacted with the solution to form $Na_2SO_4$ in the presence of catalytically effective quantities of iron, cobalt, nickel, manganese or vanadium or compounds thereof intrinsically present in the gas stream as impurities or added thereto to catalyze the reaction. A portion of the solution is directly recycled into the scrubber while a second portion, continuously withdrawn from the scrubber, is treated with calcium hydroxide ($Ca(OH)_2$) to precipitate calcium sulfate ($CaSO_4$) and form NaOH in the supernatant liquid. The latter is recycled to the scrubber and the rate at which NaOH is returned from the second portion to the scrubber is approximately equal to the rate at which the NaOH is consumed in the scrubber by reaction with $SO_2$.

6 Claims, 1 Drawing Figure

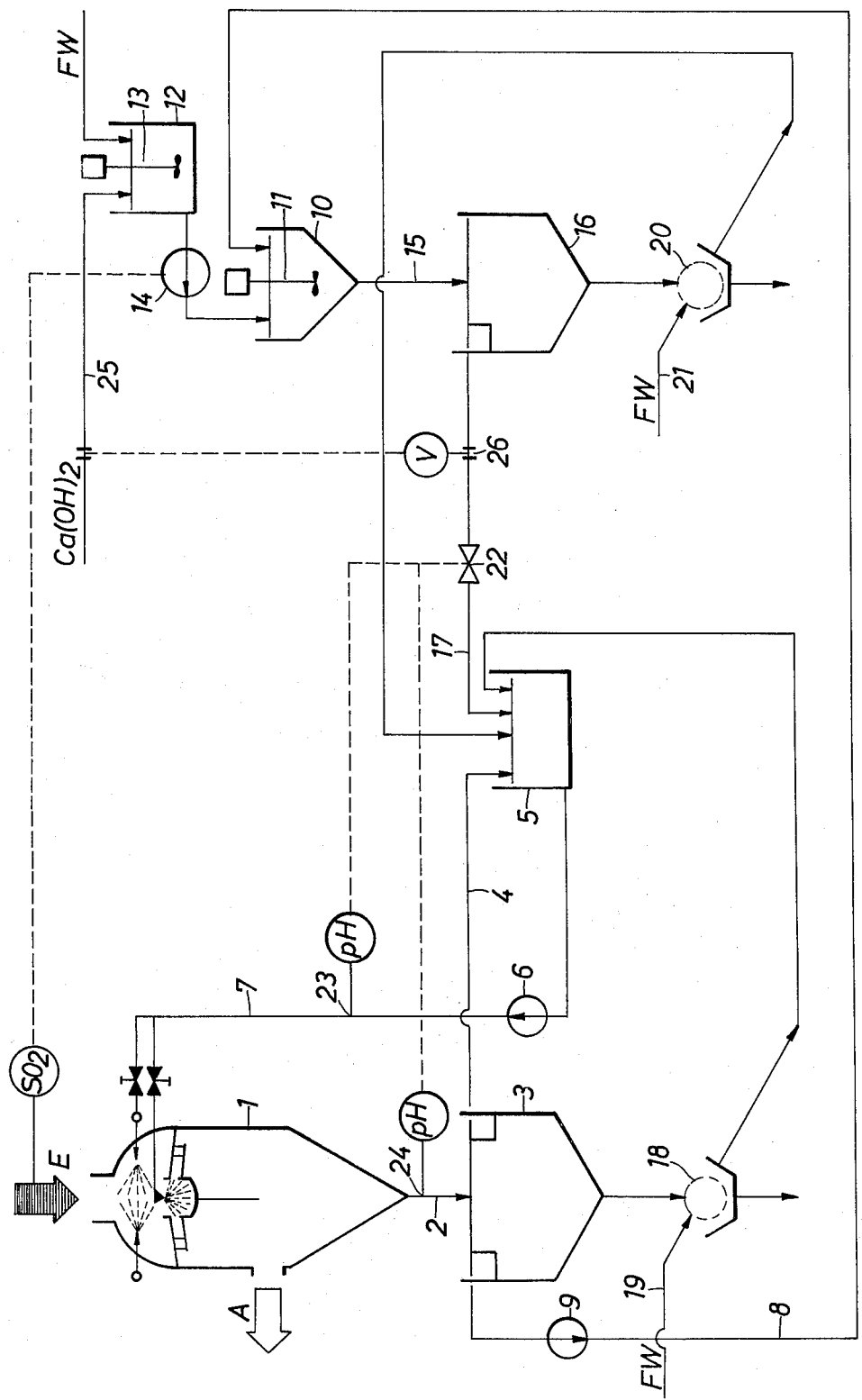

METHOD OF REMOVING SULFUR DIOXIDE FROM A DUST CONTAINING EXHAUST GAS STREAM

FIELD OF THE INVENTION

The present invention relates to a method of removing sulfur dioxide from a gas stream containing same and, more particularly, to a method of removing sulfur dioxidd from dust-containing exhaust gases, especially the waste gases of metallurgical processes.

BACKGROUND OF THE INVENTION

Atmospheric and environmental pollution with sulfur oxides, especially sulfur dioxide, contained in exhaust gas or waste gas released into the atmosphere, constitutes a significant problem in substantially all industial societies. The sulfur dioxide may be formed by combustion of sulfur-containing fuels (petroleum or coal), in the roasting of sulfidic metal ores and in numerous other chemical and metallurgical processes.

In recent years considerable effort has been exerted in order to remove sulfur dioxide from gases which are ultimately to be released into the atmosphere or from the combustible products from which such gases derive. For example, there is now a common practice to provide a desulfurizing plant or installation immediately downstream from an installation or plant producing exhaust or waste gases containing sulfur dioxide. These desulfurizing plants may include mechanical filters upon which particulate materials are trapped, adsorber systems on which the sulfur dioxide is adsorbed, electrostatic precipitators which collect the dust particles with partial adsorption of sulfur dioxide and like systems. All of these arrangements are relatively expensive to construct and operate and have poor economy, even where the sulfur dioxide is recovered as a useful compound.

It is known to treat gases containing sulfur dioxide with an alkaline suspension in an absorption column or scrubber, the sulfur dioxide reacting with the alkali to form a sulfite salt. For example, a suspension of lime or calcium hydroxide in an aqueous system may be used for scrubbing sulfur dioxide from the gas stream, the process being generally designated as a "wet-lime-process" in which the products include calcium sulfite ($CaSO_3$), calcium sulfate ($CaSO_4$) and calcium carbonate ($CaCO_3$). These products deposit in the conduits and in the scrubber or absorption column so that the deposits must be removed from time to time, thereby interrupting the continuity of the process.

To avoid such interruptions, a two-stage process has been proposed in which the gas is first scrubbed with an acid medium at a pH below 4 and then with an alkaline medium at a pH above 9. The deposits are formed in the latter stage and the two scrubbers are then functionally interchanged, i.e. the direction of flow of the gas and the absorbed liquid are reversed and the acid treatment takes place in the scrubber or absorber formerly used for the alkaline treatment and vice versa. During the acid treatment, the deposits are removed by solubilization as new deposits are formed in the absorber in which alkaline treatment is carried out. Here, too, the absorption liquid is a suspension of calcium hydroxide. The calcium sulfite ($CaSO_3$) which is formed in solution in this system can be oxidized to calcium sulfate ($CaSO_4$) in an aerating tower spatially removed from the scrubber and the calcium sulfate is recovered in solid form. When continuous operation is desired with this two-stage system, the expenditures are also high from a capital and an operating point of view.

Still another conventional process for the removal of sulfur dioxide from an exhaust gas involves scrubbing of the exhaust gas with aqueous sodium sulfite solution. Part of this sulfite forms the disulfite by absorption of $SO_2$ from the gas and the addition of zinc oxide in excess of the stoichiometric quantity transforms the sodium disulfite into zinc sulfite and zinc oxide. The zinc sulfite, which is substantially insoluble, and residual zinc oxide are filtered from this solution, washed, dried and calcined. In the calcination treatment, the zinc sulfite is pyrolytically decomposed to form sulfur dioxide gas and zinc oxide. The sulfur dioxide gas is then liquefied or converted to sulfuric acid by the contact process while the zinc oxide is returned to precipitate additional quantities of zinc sulfite. The oxygen contained in the flue gas continuously oxidizes part of the sodium sulfite to form the sodium sulfate and the sulfate ion must be removed before zinc oxide is added to prevent formation of the highly soluble zinc sulfate. For this reason lime is continuously added to precipitate the calcium sulfate. The resulting gypsum and insoluble components of the fly ash are filtered off and are discarded. The main disadvantages of this process are that substantially all of the equipment of the disulfurizing plant must be composed of corrosion-resistant material at high cost. In addition, the process involves a relatively large number of steps and is therefore relatively complex.

OBJECTS OF THE INVENTION

It is the principal object of the present invention to provide an improved method, process or system for the removal of sulfur dioxide from a gas stream whereby the aforedescribed disadvantages are obviated and the process can be carried out under optimum conditions.

It is another object of the invention to provide an improved method of treating gas streams containing sulfur dioxide in which the sulfur dioxide is quantitatively removed from the gas stream in a simple and economical manner.

Still another object of the invention is to provide a process of the character described in which regeneration of an absorbent medium can be effected under optimal conditions.

SUMMARY OF THE INVENTION

These objects and others which will become apparent hereinafter are attained, in accordance with the present invention, by scrubbing a gas stream containing sulfur dioxide with an aqueous absorbent solution of sodium hydroxide (NaOH) and disodium sulfate ($Na_2SO_4$), recovering the absorbent solution from the scrubbing step and recirculating part of this solution directly to the scrubber after clarification of the scrubbing liquid, and treating the second part of the scrubbing solution with calcium hydroxide to precipitate calcium sulfate and reform sodium hydroxide in the supernatent liquid. This sodium hydroxide solution is then recycled to the scrubber and, of course, mixes with the scrubbing liquid therein.

The invention utilizes the principle that a major part of the sulfur dioxide in the gas stream is reacted to form $Na_2SO_4$ in a solution of NaOH and $Na_2SO_4$ in the presence of catalytic metals or catalytic metal compounds and the sodium sulfate, in turn, can be transformed into sodium hydroxide by precipitation of calcium sulfate from the solution with the addition of calcium hydroxide. Preferably the catalytic substances necessary to effect the reaction are present in the gas stream which should contain a dust at least partly made up of the catalytic metals or their compounds. It is also important to the present invention that the rate of flow of the second stream is controlled such that sodium hydroxide is returned to the scrubber at approximately the same rate as it is consumed by reaction with sodium dioxide.

The invention has the advantage that the sulfur dioxide is absorbed initially in a particularly effective manner in relltively expensive sodium hydroxide but the latter is fully recoverable since the reaction does not lead to sodium sulfite as a product, but, because of the presence of the catalysts, proceeds directly to the sodium sulfate which is soluble and can be quantitatively retransformed into sodium hydroxide.

The sodium sulfate solution is recirculated and sodium hydroxide is regenerated only in a portion of the recirculating scrubbing liquid so that high concentration of sodium sulfate may be maintained and a correspondingly efficient transformation of the sodium sulfate to sodium hydroxide is insured in the partial stream.

The process is simple to carry out and control, does not require high capital expenditures and brings about simultaneous removal of dust and removal of sulfur dioxide from the exhaust gas. It has already been noted that the presence of the dust is an advantage rather than a disadvantage since high dust concentration in many waste gas streams increases the likelihood that the catalytically effective metals or metal compounds will be present.

The preferred catalyst metals are iron, cobalt, nickel, manganese and vanadium and the metals may be used as elemental-metal particles or as compounds (e.g., the metal oxides). The process is best practiced with metallurgical waste gases and especially those which derive from ferrous metallurgy.

Where the concentration of the catalyst is insufficient as empirically determinable by analyzing the scrubbing liquid to determine where sodium sulfite is present therein, we may add quantities of the catalyst metals or their compounds. The catalyst metals may be introduced as dust into the gas stream or may be fed directly into the scrubber.

The process, according to the invention, has been found to be most effective with iron-containing dusts, e.g., dusts derived from sintering plants or from coal-fired furnaces, and with vanadium-containing dusts from oil-fired furnaces. Such dusts may be collected on filters and can be blown into the gas stream to be treated according to another feature of this invention.

Since the removal of sulfur from the absorbent liquid by precipitation of calcium sulfate in the second partial stream dust materially having any catalytically effective compounds in the solution, and small quantities of the catalytically effective metals or compounds may remain the recirculated liquid after clarification, continuity of the catalytic action is ensured even where further addition of the catalyst is terminated following an initial period of operation of the system.

According to still another feature of the invention, the second partial stream and the introduction of calcium hydroxide thereto are automatically controlled in accordance with the pH value at the inlet and/or outlet of the scrubber. This automatic control facilitates supervision of the absorption operation. It has also been found to be advantageous to automatically control these parameters in dependence upon the sulfur dioxide content of the incoming raw gas in addition to or as an alternative to the use of pH as the control.

Where the scrubber is of a venturi type or in other scrubbers in which it is not possible to reduce the sulfur dioxide content to a sufficiently low value, we may make use of a scrubber having a series of scrubbing stages, the scrubbing liquid and the gas passing through several of these stages. The system has been found to be free from a tendency to form deposits and allows the separate handling of collected dust and gypsum. The process has been found to be particularly suitable for the treatment of exhaust gases having less than 1 percent by volume sulfur dioxide.

BRIEF DESCRIPTION OF THE DRAWING

The above and other objects, features and advantages of the present invention will become more readily apparent from the following description, reference being made to the accompanying drawing the sole FIGURE of which is a flow diagram of a plant or installation for carrying out the process of the present invention.

SPECIFIC DESCRIPTION

In the drawing we show a venturi scrubber and absorber 1 whose outlet 2 opens into a dust-settling container 3 or clarifier. The collected solids pass into a sludge dewatering unit 18 supplied with fresh water at 19. A pipe 4 carries the decanted liquid from the settling tank 3 to a reservoir 5 connected by a pump 6 with an inlet of the venturi scrubber 1. The first partial stream of scrubbing liquid is recirculated by this pump 6.

Part of the scrubbing liquid (second partial stream) is displaced by a pump 9 through a conduit 8 to a precipitating reaction vessel 10 to which calcium hydroxide is supplied in a suspension from a tank 12 provided with a stirrer 13. The calcium sulfur is recovered in a settling tank 16 and is rinsed with fresh water at 21 in a sludge dewatering unit 20. The decanted liquid, constituting a sodium hydroxide solution, is returned at 17 to the tank 5.

An aqueous solution of $Na_2SO_4$ and NaOH is injected into the raw gas E, which contains $SO_2$ and dust, in the scrubbing zone of the Venturi-type scrubber 1. As a result, the gas is cooled and saturated, the dust is scrubbed from the gas, and the $SO_2$ contained in the exhaust gas is absorbed by the scrubbing and absorbent liquid and in accordance with the invention is directly reacted to form $Na_2SO_4$ with the aid of catalysts contained in the gas and in the liquid.

The purified gas leaves the scrubber and absorber 1 at A. The scrubbing liquid discharged from the scrubber flows through a discharge conduit 2 to a dust-settling container 3.

A major portion of the clarified scrubbing liquid is passed over a weir and a discharge conduit 4 to a receiver 5, which is associated with a booster pump 6, which recycles this part of the scrubbing liquid through a supply conduit 7 to the scrubbing zone.

Part of the clarified scrubbing liquid from the dust-settling container 3 is pumped by a feed pump 9 through a pipeline 8 to a reaction vessel 10. In a container 12, a suspension is formed by stirring calcium hydroxide into fresh water FW. The stirrer 13 prevents a segregation.

The Ca (OH)$_2$ is metered into the reaction vessel 10 by a metering pump 14. In the vessel 10, the above-described reaction between the sodium sulfate contained in the scrubbing liquid to be regenerated and the metered calcium hydroxide takes place. The reaction is accelerated by an intense stirring with a stirrer 11. The reacted scrubbing liquid is discharged through a pipeline 15 into a salt-settling tank 16.

The supernatant scrubbing liquid which has been clarified and regenerated is returned into the receiver 5 and is mixed with the overflow from the dust-settling container 3. The sludge from the dust-settling container 3 is fed to a sludge-dewatering unit 18, in which the sludge is washed with part of the fresh water 19 required to make up for the evaporation losses. Adhering sodium compounds are recovered by this washing.

The filtrate discharged from 18 is returned to the receiver 5. The calcium sulfate sludge from the salt-settling tank 16 is similarly dewatered in a sludge-dewatering unit 20 and is wahed with additional fresh water. The filtrate from the sludge-dewatering unit 20 is also recycled to the receiver 5.

The partial steam rate and the pH-value are automatically controlled to maintain a constant pH-value in the supply conduit 7 leading to the scrubber. This pH value is the pH-value of the mixture consisting of the overflow from the dust-settling container 3, the regenerated scrubbing liquid from the salt-settling basin 16, and the filtrates from the sludge-dewatering units.

A pH-sensor 23 is arranged in the supply conduit 7 leading to the scrubber and produces a signal which controls the control valve 22 in the discharge conduit 17 for the regenerated scrubbing liquid. When the pH-value in the conduit leading to the scrubber increases or decreases above a desired value, regenerated scrubbing liquid is supplied at a lower or higher rate, respectively.

Similarly, the rate of scrubbing fluid in the discharge pipe 2 leading from the scrubber may be controlled by the control valve 22 in dependence on the pH-value at 24.

The calcium hydroxide rate is metered at 25, suitably by a controllable metering screw, and is selected so that its average is in stoichiometric proportion to the rate at which SO$_2$ is to be absorbed. A difference between the set and required rates of calcium hydroxide results in changes in concentration in the discharge pipe 17. If calcium hydroxide is added in more than the stoichiometric proportion, a lower rate of regenerated scrubbing liquid is sufficient to maintain a constant pH-value at 23. The rate of regenerated scrubbing liquid is sensed by the volumetric flow meter 26 and may vary between upper and lower limits. The calcium hydroxide rate is increased or decreased when the upper or lower limit is reached.

Alternatively, the metering may be automatically controlled in dependence on the SO$_2$ content of the raw gas. For this purpose, the SO$_2$ content of the raw gas is sensed by an SO$_2$ sensor and the metering pump 14 is controlled in proportion therewith. The means 25 for metering the calcium hydroxide are readjusted when the concentration of the continuously prepared milk of lime changes above or below predetermined values.

SPECIFIC EXAMPLES

EXAMPLE I

The exhaust gas from an iron ore-sintering plant was scrubbed and desulfurized in an experimental plant in accordance with the FIGURE.

In case of an exhaust gas rate of 3700 standard cubic meters per hour, a dust content in the raw gas of 1.4 grams per standard cubic meter, an SO$_2$ content of 1200 milligrams per standard cubic meter, the dust content of the exhaust gas was decreased by 95% to 70 milligrams per standard cubic meter and the SO$_2$ content was decreased by about 90% to 120 milligrams per standard cubic meter. The pressure loss in the scrubber was 300 millimeters (water column).

The scrubbing liquid consisted of a solution of about 2 – 3% by weight Na$_2$SO$_4$ (Glauber salt). It contained NaOH at the rate required for absorption and was injected into the single-stage scrubber at a rate of about 3.3 liters per standard cubic meter.

The pH-value of the supplied absorbent and scrubbing liquid was between 7 and 9 as the liquid was supplied to the scrubber and between 6 and 7 as it was discharged therefrom. An automatic control was performed in dependence on the pH-value in the discharge conduit leading from the scrubber, where a pH-value of 6.5 – 7 was maintained. Care was taken to prevent a pH-value above 7 in order to prevent an absorption of CO$_2$.

For a regeneration of the consumed NaOH solution, about 6.6 percent by weight of the entire scrubbing solution in circulation was branched off into a second partial cycle. In the reaction vessel, Ca(OH)$_2$ at the rate of 4.9 kilograms per hour were added to the Na$_2$SO$_4$ solution in the regenerating cycle, whereby salt sludge was formed at a rate of about 10.4 kilogram per hour. The salt sludge consisted by weight of 92% calcium sulfate, 5% calcium sulfite, and 3% accompanying substances. The scrubbing liquid discharged from the scrubber contained suspended solids at an average rate of 0.5–0.8 gram per liter. Its content of soluble trivalent iron was between 10 and 20 milligrams per liter and averaged 14 milligrams per liter.

EXAMPLE II

Iron ore-sintering plant with scrubbing plant for desulfurizing the exhaust gas from the sintering process and for collecting dust therefrom at the same time. A dry cyclone was used for a preliminary dust collection.

| | |
|---|---|
| Rate of moist exhaust gas | 75,000 standard cubic meters per hour |
| Dust content in raw gas before cyclone, average | 2.4 grams per standard cubic meter |
| Dust content in raw gas before scrubber | 350–450 milligrams per standard cubic meter |

SO$_2$ content of raw gas, average 2.2 grams per standard cubic meter

SO$_3$ content of raw gas, average 200 milligrams per standard cubic meter.

The average composition of the gas in percent by volume was:

| | |
|---|---|
| $CO_2$ | 11 |
| $CO$ | 3.5 |
| $O_2$ | 12.5 |
| $H_2O$ | 8 |
| $N_2$ | 67 |
| Temperature of raw gas | 90–110°C. |

In the scrubber resulting in a pressure loss of 350 millimeters water, the exhaust gas was subjected to a fine dust collection to a dust content of 70 milligrams per standard cubic meter and the $SO_2$ content was decreased by 90% to 200 milligrams per standard cubic meter.

As scrubbing liquid, a solution which contained 3.5% $Na_2SO_4$ and about 0.9% NaOH was injected. The pH-value of the scrubbing liquid was between 7 and 9 at the inlet and between 5.5 and 7 at the outlet from the scrubber.

To regenerate the used NaOH solution, about 16–20% of the scrubbing liquid in circulation were continuously transferred from the scrubber cycle into the regenerating cycle. In a suspension of about 10% by weight, $Ca(OH)_2$ was supplied at a rate of about 430 kilograms per hour. The salt sludge consisted by weight of about 86% $CaSO_4 \cdot 2H_2O$, 5.5% $CaSO_3$, and about 8.5% unconsumed $Ca(OH)_2$ and accompanying substances. When the sludge had been discharged, backwashed and mechanically dewatered, it contained in solution sodium at a rate of 12–15 kilograms per hour, calculated as $Na_2SO_4$, which must be replaced.

25 kilograms wet dust were discharged per hour. This sludge contained by weight essentially 77–83% $Fe_2O_3$, 2.5–6% FeO and 4–7% $SiO_2$. The scrubbing liquid discharged from the scrubber was the same as in the preceding example.

We claim:

1. A process for removing sulfur dioxide from a dust-containing gas stream comprising the steps of:
   a. scrubbing said dust-containing gas stream with an aqueous solution of sodium hydroxide and sodium sulfate drawn from a solution reservoir in the presence of a catalyst containing material selected from the group consisting of iron, cobalt, nickel, manganese and vanadium, said catalyst being capable of promoting the substantially complete coversion of the sulfur dioxide of said gas stream with the sodium hydroxide of said solution into sodium sulfate;
   b. continuously withdrawing the solution laden with sodium sulfate from step (a), measuring its pH value and feeding it to a settling zone and producing a supernatant liquid therein;
   c. feeding a first partial stream of supernatant liquid from said settling zone to said solution reservoir;
   d. feeding a second partial stream of said supernatant liquid from said settling zone to a precipitation zone and mixing said second partial stream with calcium hydroxide to precipitate calcium sulfate therefrom and form a second supernatant liquid containing sodium hydroxide, and withdrawing calcium sulfate from said precipitation zone;
   e. feeding said second supernatant liquid from said precipitation zone to said solution reservoir and adjusting the amount of said second supernatant liquid to keep the pH value of the laden solution of step (b) in the range of 6.5 to 7.

2. The process defined in claim 1 wherein said catalyst is added to said aqueous solution of sodium hydroxide and sodium sulfate prior to its use in step (a) for the scrubbing of said dust-containing gas.

3. The process defined in claim 1 wherein said catalyst is added to said dust-containing gas stream prior to the scrubbing thereof with said aqueous solution of sodium hydroxide and sodium sulfate in step (a).

4. The process defined in claim 1 wherein said catalyst is added during the scrubbing of said dust-containing gas stream with said aqueous solution of sodium hydroxide and sodium sulfate in step (a).

5. The process defined in claim 1 wherein said catalyst is present originally as dust in said gas stream prior to scrubbing in step (a).

6. The process defined in claim 1 wherein the scrubbing is carried out in step (a) in a plurality of scrubbing stages in series.

* * * * *